United States Patent Office 3,465,240
Patented Sept. 2, 1969

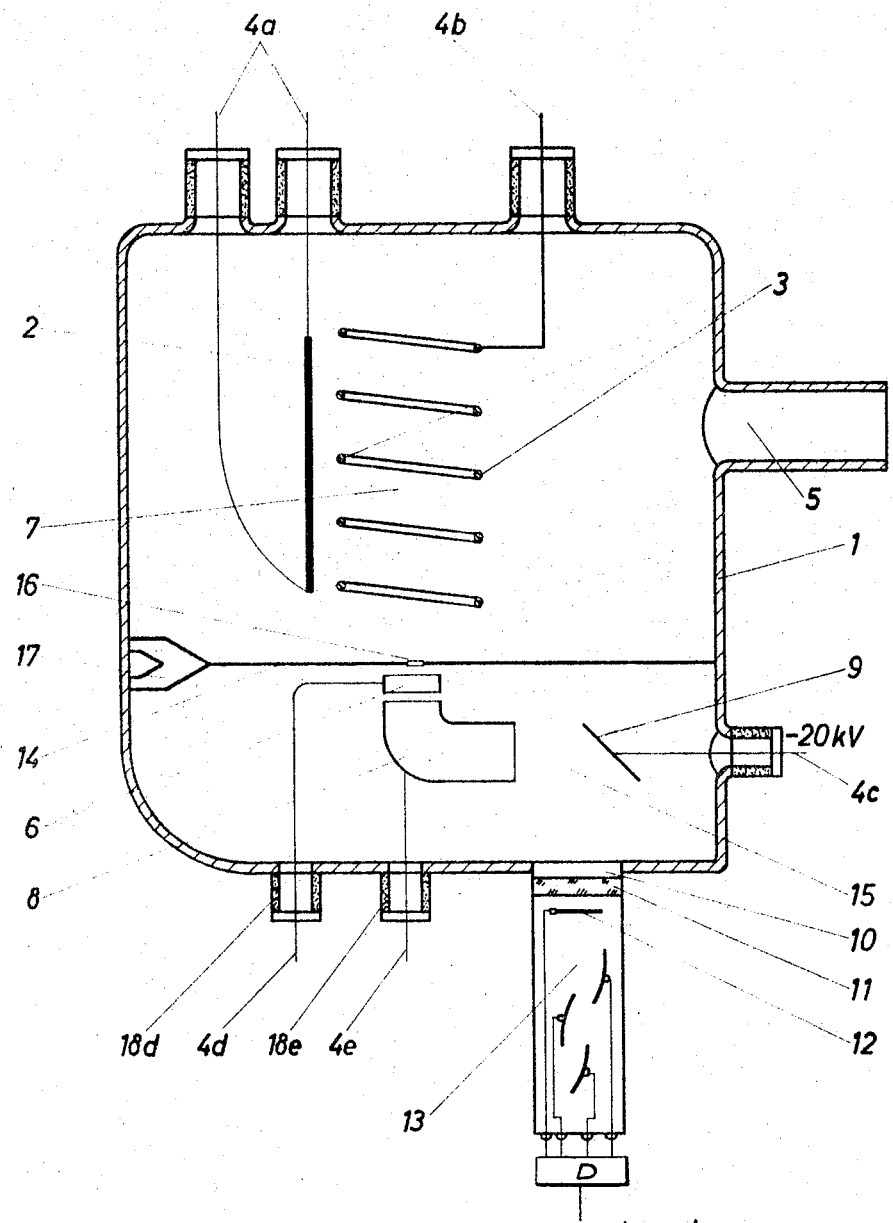

3,465,240
MEASURING TUBE FOR AN IONIZATION VACUUM GAUGE
Maximilian Wutz, Gross-Krotzenburg, Germany, assignor, by mesne assignments, to Leybold-Heraeuse-Verwaltung GmbH, Cologne-Bayenthal, Germany
Filed Sept. 5, 1967, Ser. No. 665,321
Claims priority, application Germany, Sept. 14, 1966,
H 60,499
Int. Cl. G01n 27/62
U.S. Cl. 324—33                 6 Claims

ABSTRACT OF THE DISCLOSURE

Measuring tube for an ionization vacuum gauge in which an ion generating chamber is separated from an ion converting chamber by a photon impermeable plate having an aperture by which the two chambers are connected. An electron source and a positive grid-shaped electrode with respect thereto are provided within the generating chamber while an ion deflecting means is provided within the converting chamber and ion lens aligned with the aperture is provided between the plate and the deflecting means. Moreover, ion converting means is positioned within the converting chamber to receive ions deflected from the deflecting means. This arrangement allows the accurate measuring of low gas pressures and substantially eliminates the effects of extraneous currents generated during the measuring process.

---

The present invention relates to a measuring tube for an ionization vacuum gauge for measuring very low gas pressures.

For measuring low gas pressures it is already known to employ ionization vacuum gauges which are equipped with a measuring tube of the Bayard-Alpert type. Such a measuring tube contains an electric filament serving as an electron source. The electrons which are emitted from this filament are accelerated in the direction toward a grid-shaped electrode which may be connected to a voltage of, for example, +150 v. This tube is further provided with a collector electrode which has a voltage of, for example, −30 v. The electrons then oscillate around the grid wires and thereby ionize the gas atoms in the measuring tube which is connected to an evacuated vessel for measuring the pressure therein. The ions which are formed are then collected by means of the collector electrode. The measured ion current which is usually amplified forms a measurement for determining the pressure prevailing in the measuring tube and thus also the pressure prevailing in the evacuated vessel.

This known measuring tube is, however, not suitable for measuring very low pressures. The impact of electrons upon the wires of the grid-shaped electrode results in the production of photons (i.e. low-energy X-rays) which, when impinging upon the collector electrode release electrons therefrom. Since when measuring the collector current it is impossible to distinguish between impinging ions and emitted electrons, the lowest measuring limit of the measuring tube will be reached when the electron current which is produced by the photons impinging upon the collector electrode has exactly the same value as the ion current. This measuring limit is called the "X-ray limit" of the measuring tube. This X-ray limit of a conventional Bayard-Alpert measuring tube amounts to approximately $10^{-10}$ mm. Hg when the collector electrode has a diameter of approximately 0.1 mm.

For reducing the X-ray limit of the measuring tube it has already been proposed to reduce the diameter of the collector electrode since this is tantamount to a reduction of the effective surface area for receiving the photons. However, because of the high sensitivity of such thin collector electrode filaments to shock and vibrations, the use of measuring tubes containing such filaments entails very serious difficulties and may render the apparatus in which they are employed useless for practical purposes.

Even if the mentioned X-ray effect is not considered, it is extremely difficult by means of such a measuring tube to measure the small ion currents occurring at low pressures. Thus, for example, when carrying out measurements by means of an ionization vacuum gauge which is provided with a Bayard-Alpert measuring tube, the strength of the ion current is approximately two decimal powers less than the pressure which is measured in mm. Hg when the tube is operated in the usual manner at an emission current of 1 ma. Thus, for example, at a pressure of $10^{-13}$ mm. Hg, the strength of the ion current would then amount to $10^{-15}$ A. The measuring of such small currents involves considerable expense not only for the amplifier but also for producing the low-voltage lead-in for the collector electrode since even the smallest impurities will reduce the electric resistance of the low-voltage lead-in to such an extent that it becomes practically impossible to measure very small ion currents regardless of the amount of electronic devices which might be employed.

In the art of mass spectrometry it is known to employ ion converters for determining the presence of ions. Such an ion converter essentially consists of a reflecting plate, a scintillator, and a secondary electron multiplier. The ions impinging upon the reflecting plate release secondary electrons from this plate which are accelerated in the direction toward the scintillator and impinge thereon. The electrons produce scintillations which fall on the cathode of the secondary electron multiplier and cause the emission of electrons therefrom which are multiplied and thus amplified by a factor of approximately $10^6$. A current impulse then occurs on the anode of the secondary electron multiplier which is amplified by the factor of $10^6$ and can be determined by conventional means.

It is an object of the present invention to provide a measuring tube for an ionization vacuum gauge which permits extremely low pressures to be measured with high accuracy and without requiring expensive means. For attaining this object the invention provides that the measuring tube comprises an electron source and a grid-shaped electrode which has a positive electric potential relative to the electron source. An inventive feature of this measuring tube consists in providing it with an ion lens, an electrostatic ion deflecting device subsequent to this lens, and an ion converter of a type known as such, and at the inside of the measuring tube in providing a photon impermeable plate which divides the inside of the tube into an ion generating chamber and an ion converting chamber which communicate with each other through an aperture which is provided in the photon impermeable plate opposite to the ion lens. The measuring tube which is designed according to the invention has the advantage that it practically eliminates the X-ray effect which determines the measuring limit of the Bayard-Alpert measuring tubes, and that by employing a highly effective ion converter of a type known as such it permits ion currents for ion impulses of an extremely small intensity to be measured. In principle, the present invention even permits individual ions to be counted. The photon impermeable plate which is provided with an aperture and divides the inside of the measuring tube into two chambers, as well as the ion lens and the electrostatic deflecting device for the ions and which pass from the ion generating chamber into the ion converting chamber insure that, on the one hand, no photons from the generating chamber will impinge directly upon the reflecting plate of the ion converter and that, on the other hand, the ions will be directed toward the reflecting plate and may then be utilized for measuring purposes. The measuring tube according to the invention therefore permits extremely low pressures to be measured without requiring the use of very large, complicated and expensive means.

The features and advantages of the present invention will become further apparent from the following detailed description thereof which is to be read with reference to the accompanying diagrammatic drawing which shows a cross section of the preferred embodiment of the measuring tube according to the invention.

As illustrated in the drawing, the new measuring tube comprises a housing 1 in which a heated filament like cathode 2 serving as an electron source and a grid-shaped electrode 3 are mounted which is provided with a positive potential relative to the cathode 2. The housing 1 of the tube preferably consists of metal. The electric lead-ins 4a to the cathode 2 and the lead-in 4b to the electrode 3 are electrically insulated and vacuum sealed relative to the wall of housing 1 through which they are passed. Housing 1 is further provided with a socket 5 for connecting the measuring tube to an evacuated vessel, not shown, the vacuum of which is to be measured.

Of course, it is also possible to design the measuring tube as a so-called built-in tube, in which case the cathode 2 and the grid-shaped electrode 3 are mounted within the evacuated vessel itself.

The lead-ins 4a and 4b may then be passed through the photon impermeable plate 14 and be passed in a vacuum sealed manner through the lower wall of the measuring tube to the outside.

The electrons emitted from the hot cathode 2 are accelerated toward the grid-shaped electrodes 3 and oscillate around the same. The gas molecules which are contained at the inside of the tube are thereby ionized. The ions which are thus produced then pass from the ion generating or ionizing chamber 7 through an ion lens 6 into a deflecting device 8 in which they are deflected at an angle of about 90° or more and accelerated toward a reflecting plate 9 which is provided with a high negative potential relative to the ground. The lead-in 4c for this reflecting plate 9 is electrically insulated from the wall of housing 1 and passes in a vacuum sealed manner therethrough, for example, to a voltage source of −20 kv. The ions impinging on the reflecting plate 9 produce an emission of secondary electrons therefrom which are accelerated toward a scintillator 10 which is connected to a ground potential. In the scintillator 10, the secondary electrons produce scintillations which pass through a glass plate 11 upon the cathode 12 of a secondary electron multiplier 13, as indicated diagrammatically in the drawing and there produce an emission of electrons which are amplified approximately by the factor of $10^6$ by the dynodes of the secondary electron multiplier 13. The current impulse which is amplified to this extent may be conducted from the anode of the multiplier 13 and be measured or indicated in a conventional manner. Since the invention provides that insofar as the vacuum is concerned the multiplier 13 is separated from the actual measuring tube by the glass plate 11, it is free of the fluctuations which occur in a so-called open secondary electron multiplier the cathode 12 of which is located, for example, within the measuring tube in the place of the reflecting plate 9.

In order to prevent any photons from impinging directly from the ionizing chamber 7 upon the reflecting plate 9, a photon impermeable plate 14 is mounted within the housing 1 which divides the inside of the measuring tube into the ion generating chamber 7 and the ion converting chamber 15, and is provided with an aperture opposite to the ion lens 6 so as to permit the ions to pass from the generating chamber 7 to the converting chamber 15. For improving the evacuation of the ion converting chamber 15, an light impermeable baffle 17, for example, a Chevron baffle, is mounted between the edge of plate 14 and the wall of housing 1. The photons which pass from chamber 7 through the aperture 16 into chamber 15 are prevented by the ion deflecting element 8 from impinging upon the reflecting plate 9. In order to prevent a reflection of photons as much as possible, it is advisable to blacken at least the part of the inner side of the deflecting element 8 facing the aperture 16 and/or to make the deflecting element 8 of wire material. By means of the lead-ins 4d and 4e which are electrically insulated from the wall of housing 1 and pass in a vacuum sealed as well as light impermeable manner through ceramic ducts 18d and 18e to the outside of the housing, a suitable electric potential is applied upon the ion lens 6 and the deflecting element 8.

In order to protect the scintillator 10 from stray light, it is advisable to provide it with a light impermeable layer or coating which is still substantially permeable for electrons of an energy of 20 kv. and may consist, for example, of aluminum which is applied upon the scintillator by vaporization. This coating is connected to the ground potential. Since the secondary electron multiplier 13 will produce a number of so-called dark impulses (i.e., impulses which occur in the absence of light) per unit of time this being known as the "dark current" even when not affected by radiation and since the ion current also releases electrons from the reflecting plate 9 primarily by field emission, an "impulse zero condition" will be produced by these two influences which corresponds to the so-called tube noise and in actual practice determines the lower measuring limit of the measuring tube according to the invention. However, since the noise impulses generally have a lower level than the impulses which are produced by ion conversion, it is possible to increase the measuring sensitivity of the measuring tube according to the invention to a still greater extent by impulse discrimination for example, by discriminating means D.

Although my invention has been illustrated and described with reference to the preferred embodiment thereof, I wish to have it understood that it is in no way limited to the details of such embodiment but is capable of numerous modifications.

Having thus fully disclosed my invention, what I claim is:

1. A measuring tube for an ionization vacuum gauge comprising a housing, a photon impermeable plate within said housing dividing its inside into an ion generating chamber and an ion converting chamber and having an aperture connecting said chambers, and electron source and a grid-shaped electrode associated with and adapted to have a positive electric potential relative to said electron source within said generating chamber, electrostatic ion deflecting means in said converting chamber, and ion lens in said converting chamber intermediate said deflecting means and said plate and facing said aperture, and ion converting means located in said converting chamber beyond said deflecting means in a position for receiving ions deflected therefrom for converting said ions into a signal indicative of the pressure.

2. A measuring tube as defined in claim 1, further comprising a light impermeable baffle intermediate said generating and converting chambers and interconnecting said housing and said plate and mounted at the edge of said plate.

3. A measuring tube as defined in claim 1, wherein said ion converting means comprise a scintillator, a reflecting plate intermediate said deflecting means and said scintillator, a light impermeable but electron-transmissive layer covering said scintillator and adapted to have a positive electric potential relative to said reflecting plate.

4. A measuring tube as defined in claim 3, wherein said deflecting means comprises a curved tubular member having one end facing said ion lens and another end facing said reflecting plate, the inner side at least of the part of said member facing said lens being blackened.

5. A measuring tube as defined in claim 3, wherein said deflecting means comprises a curved tubular member having one end facing said ion lens and another end facing said reflecting plate and made of wire material.

6. A measuring tube as defined in claim 1, further comprising discriminating means for suppressing the dark pulses.

References Cited

UNITED STATES PATENTS

| | | | |
|---|---|---|---|
| 2,516,704 | 7/1950 | Kohl | 324—33 XR |
| 2,979,617 | 4/1961 | Somerville | 250—71.5 |
| 3,378,712 | 4/1968 | Lafferty | 324—33 XR |

FOREIGN PATENTS

| | | |
|---|---|---|
| 1,012,246 | 12/1965 | Great Britain. |

OTHER REFERENCES

Fox et al., Photomultiplier Ionization Gauge, Review of Scientific Instruments, vol. 32, No. 2, February 1961, pp. 218 and 219.

DONALD O. WOODIEL, Primary Examiner

U.S. Cl. X.R.

250—71.5; 313—7, 63